(12) United States Patent
Derenick et al.

(10) Patent No.: US 10,364,042 B2
(45) Date of Patent: Jul. 30, 2019

(54) MULTISPECTRAL SENSOR FUSION SYSTEM FOR PLATFORM STATE ESTIMATION

(71) Applicant: Sikorsky Aircraft Corporation, Stratford, CT (US)

(72) Inventors: Jason C. Derenick, Hamden, CT (US); Hongcheng Wang, Farmington, CT (US); Christopher Stathis, Hamden, CT (US); Igor Cherepinsky, Sandy Hook, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 0 days.

(21) Appl. No.: 15/528,637

(22) PCT Filed: Nov. 19, 2015

(86) PCT No.: PCT/US2015/061706
§ 371 (c)(1),
(2) Date: May 22, 2017

(87) PCT Pub. No.: WO2016/085769
PCT Pub. Date: Jun. 2, 2016

(65) Prior Publication Data
US 2017/0267374 A1 Sep. 21, 2017

Related U.S. Application Data

(60) Provisional application No. 62/083,436, filed on Nov. 24, 2014.

(51) Int. Cl.
*G05D 1/00* (2006.01)
*G05D 1/06* (2006.01)
(Continued)

(52) U.S. Cl.
CPC .............. *B64D 45/08* (2013.01); *B63B 35/50* (2013.01); *B64C 39/024* (2013.01); *G01C 21/00* (2013.01);
(Continued)

(58) Field of Classification Search
USPC ............................................... 701/17
See application file for complete search history.

(56) References Cited

U.S. PATENT DOCUMENTS 6,064,924 A * 5/2000 Fleischmann ........... G01S 7/411
701/16
7,778,950 B2 * 8/2010 Owechko ............ G06K 9/00369
704/231

(Continued)

FOREIGN PATENT DOCUMENTS

WO 2014169353 A1 10/2014

OTHER PUBLICATIONS

Arora, Sankalp; Jain, Sezal; Scherer, Sebastian; Nuske, Stephen; Chamberlain, Lyle; Singh, Sanjiv, "Infrastructure-free shipdeck tracking for autonomous landing," Robotics and Automation (ICRA), 2013 IEEE International Conference on Robotics and Automation, pp. 323,330, May 6-10, 2013.
(Continued)

*Primary Examiner* — Jean Paul Cass
(74) *Attorney, Agent, or Firm* — Cantor Colburn LLP

(57) ABSTRACT

An electronic landing platform state module is configured to generate a state estimation of a platform surface at sea includes a plurality of electronic platform state process modules configured to receive an output from a respective spectral sensor. The plurality of electronic platform state process modules are further configured to output a monitored spectral platform state signal in response to applying a spectral process on a respective output. Each spectral
(Continued)

process corresponds to a particular spectral modality of the respective spectral sensor. The electronic landing platform state module further includes an electronic platform state estimator module configured to determine a corrected dynamic state of the platform in response to fusing together the individual monitored spectral platform state signals.

14 Claims, 3 Drawing Sheets

(51) Int. Cl.
  B63B 35/50    (2006.01)
  B64C 39/02    (2006.01)
  B64D 45/08    (2006.01)
  G01C 21/00    (2006.01)
  G01C 21/16    (2006.01)
  G01C 23/00    (2006.01)
  G05B 13/04    (2006.01)

(52) U.S. Cl.
  CPC ........... *G01C 23/00* (2013.01); *G05B 13/048* (2013.01); *G05D 1/0088* (2013.01); *G05D 1/0684* (2013.01); *G01C 21/165* (2013.01)

(56) References Cited

U.S. PATENT DOCUMENTS

| | | | | |
|---|---|---|---|---|
| 8,195,591 | B1* | 6/2012 | Owechko | G06K 9/00369 706/45 |
| 8,457,813 | B2 | 6/2013 | Hogstrom et al. | |
| 8,554,395 | B2 | 10/2013 | Andersson | |
| 8,626,364 | B2 | 1/2014 | Moresve | |
| 8,788,446 | B2* | 7/2014 | Yao | G06N 3/0436 706/47 |
| 9,759,809 | B2* | 9/2017 | Derenick | G05D 1/0684 |
| 2003/0204382 | A1 | 10/2003 | Julier et al. | |
| 2004/0040746 | A1* | 3/2004 | Niedermayr | E21B 21/08 175/38 |
| 2004/0257264 | A1* | 12/2004 | Moeller-Jensen | G01N 33/1833 342/52 |
| 2005/0114023 | A1 | 5/2005 | Williamson et al. | |
| 2009/0276184 | A1* | 11/2009 | Mylaraswamy | G01D 18/00 702/185 |
| 2010/0106356 | A1 | 4/2010 | Trepagnier et al. | |
| 2010/0114406 | A1* | 5/2010 | DeJonge | G01C 23/00 701/3 |
| 2011/0066307 | A1 | 3/2011 | Hiebl | |
| 2011/0291862 | A1* | 12/2011 | Broman | B63C 11/42 340/984 |
| 2012/0022350 | A1* | 1/2012 | Teixeira | A61B 5/0205 600/324 |
| 2012/0143808 | A1 | 6/2012 | Karins et al. | |
| 2012/0158222 | A1 | 6/2012 | Ehlin et al. | |
| 2014/0156806 | A1* | 6/2014 | Karpistsenko | G06F 16/25 709/219 |
| 2014/0275886 | A1* | 9/2014 | Teixeira | A61B 5/0205 600/324 |
| 2015/0066464 | A1* | 3/2015 | Altman | G01V 99/005 703/10 |
| 2015/0088346 | A1* | 3/2015 | Lee | B63B 9/001 701/21 |
| 2015/0102956 | A1* | 4/2015 | Miles | G01S 17/66 342/73 |
| 2015/0247942 | A1* | 9/2015 | Pomerantz | G01V 1/003 702/11 |
| 2015/0363914 | A1* | 12/2015 | Boyle | G06T 3/4038 345/629 |
| 2016/0009410 | A1* | 1/2016 | Derenick | G05D 1/0684 701/17 |
| 2016/0168985 | A1* | 6/2016 | Betancourt-Pocaterra | E21B 49/005 73/152.04 |
| 2016/0266246 | A1* | 9/2016 | Hjelmstad | G01S 17/023 |
| 2016/0266247 | A1* | 9/2016 | Hjelmstad | G01S 17/102 |
| 2016/0266268 | A1* | 9/2016 | Amer | G01V 1/30 |
| 2016/0274256 | A1* | 9/2016 | Coates | G01V 1/282 |
| 2016/0364989 | A1* | 12/2016 | Speasl | G08G 5/0034 |
| 2017/0184751 | A1* | 6/2017 | Ang | E21B 47/101 |
| 2017/0186185 | A1* | 6/2017 | Miles | G06T 7/11 |
| 2017/0267374 | A1* | 9/2017 | Derenick | G01C 21/00 |
| 2017/0300540 | A1* | 10/2017 | Karpistsenko | G06F 16/25 |

OTHER PUBLICATIONS

Bourgault et al., "Optimal Search for a Lost Target in a Bayesian World" S. Yuta et al. (Eds.): Field and Service Robotics, STAR 24, pp. 209-222, (2006).

Duda, R. O. and P. E. Hart, "Use of the Hough Transformation to Detect Lines and Curves in Pictures," Comm. ACM, vol. 15, pp. 11-15 (Jan. 1972).

G. Schweighofer and A. Pinz, "Robust pose estimation from a planar target," IEEE Transactions on Pattern Analysis and Machine Intelligence, vol. 28, pp. 2024-2030, 2006.

G. Xu, Y. Zhang, S. Ji, Y. Cheng, and Y. Tian, "Research on computer vision-based for uav autonomous landing on a ship," Pattern Recognition, Letters on., vol. 30, No. 6, pp. 600-605, Apr. 2009.

Green, Patrick J. "Iteratively reweighted least squares for maximum likelihood estimation, and some robust and resistant alternatives." Journal of the Royal Statistical Society. Series B (Methodological) (1984): 149-192.

JL Sanchez-Lopez; S. Saripalli; P.Campoy. "Autonomous ship board landing of a VTOL UAV". AHS 69th Annual Forum. Under Review, May 2013, pp. 1.

M. Garratt, H. Pota, A. Lambert, S. Eckersley-Maslin, and C. Farabet, "Visual tracking and lidar relative positioning for automated launch and recovery of an unmanned rotorcraft from ships at sea," Naval Engineers Journal, vol. 121, No. 2, pp. 99-110, 2009.

Martin A. Fischler and Robert C. Bolles, "Random Sample Consensus: A Paradigm for Model Filling with Applications to Image Analysis and Automated Cartography". Comm. of the ACM 24 (6): 381-395, (Jun. 1981).

Martin Ester, Hans-Peter Kriegel, Jörg Sander, Xiaowei Xu . "A density-based algorithm for discovering clusters in large spatial databases with noise". In Evangelos Simoudis, Jiawei Han, Usama M. Fayyad. Proceedings of the Second International Conference on Knowledge Discovery and Data Mining (KDD-1996). pp. 226-231.

Notification of Transmital of the International Search Report for International Application No. PCT/US2015/061706 dated Jan. 25, 2015; dated Feb. 4, 2015; 7 pages.

O. A. Yakimenko, I. I. Kaminer, W. J. Lentz, and P. A. Ghyzel, "Unmanned aircraft navigation for shipboard landing using infrared vision," IEEE Transactions on Aerospace Electronic Systems, vol. 38, pp. 1181-1200, Oct. 2002.

S. N. Corporation, "UCARS-V2 UAS common automatic recovery system—version2," 2008. [Online]. Available: http://www.sncorp.com/pdfs/cns_atm/UCARS V2Product%20Sheet.pdf, pp. 1-2.

S. Saripalli, "Vision-based autonomous landing of an helicopter on a moving target," Proceedings of AIAA Guidance, Navigation, and Control Conference, Chicago, USA, 2009, pp. 1-9.

Written Opinion of the International Searching Authority for International Application No. PCT/US2015/061706 dated Jan. 25, 2015; dated Feb. 4, 2016; 5 pages.

X. Yang, L. Mejias, and M. Garratt, "Multi-sensor data fusion for uav navigation during landing operations," in Australasian Conference on Robotics and Automation (ACRA 2011). Monash University, Melbourne, VIC: Australian Robotics and Automation Association Inc.,Monash University, 2011, pp. 1-10.

(56) References Cited

OTHER PUBLICATIONS

PCT International Preliminary Report on Patentability; International Application No. PCT/US2015/061706; International Filing Date: Nov. 19, 2015; dated May 30, 2017; pp. 1-6.

* cited by examiner

MULTISPECTRAL SENSOR FUSION SYSTEM FOR PLATFORM STATE ESTIMATION

CROSS REFERENCE TO RELATED APPLICATIONS

This application is a National Stage application of PCT/US2015/061706, filed Nov. 19, 2015, which claims the benefit of U.S. Provisional Application No. 62/083,436, filed Nov. 24, 2014, both of which are incorporated by reference in their entirety herein.

TECHNICAL FIELD

The subject matter disclosed herein relates generally to aircraft landing systems, and more particularly, to a methodology for the online tracking and state estimation of a dynamic platform surface to land at sea from an aircraft.

BACKGROUND

Unmanned aerial vehicles (UAVs), for example, fixed-wing and/or rotorcraft vehicles are powered aircraft without a human operator. As such, UAVs provide advantages over manned aircraft by removing humans from situations which may be deemed dangerous, for example, during reconnaissance or during search and rescue operations during a natural disaster. Autonomous UAVs are a natural extension of UAVs and do not require real-time control by a human operator. Autonomous UAVs may be required to land on an unprepared site or terrain without human assistance during mission operations or in an emergency.

Sea-based operation of autonomous UAVs presents a multitude of challenges. It is essential that UAVs be capable of identifying and tracking a ship deck for landing or cargo delivery in order to be a viable and effective option for sea-based operations. Ship decks or other sea-based objects are frequently located in an intensely turbulent environment. Further, significant deck or platform motion from high sea-state conditions causes an autonomous UAV landing target to move constantly with the ship's/object's yawing, pitching, and rolling motion. Current art directed to autonomous landings on sea based object such as ships, for example, has focused on ship deck mounted transponders to facilitate the measurement of the relative pose (e.g., position and orientation) of the aircraft with respect to the landing pad. However, these tracking systems are not only expensive but render an unequipped platform, such as a ship deck, unlandable.

SUMMARY

According to a non-limiting embodiment, an electronic landing platform state module is configured to generate a state estimation of a platform surface at sea includes a plurality of electronic platform state process modules configured to receive an output from a respective spectral sensor. The plurality of electronic platform state process modules are further configured to output a monitored spectral platform state signal in response to applying a spectral process on a respective output. Each spectral process corresponds to a particular spectral modality of the respective spectral sensor. The electronic landing platform state module further includes an electronic platform state estimator module configured to determine a corrected dynamic state of the platform in response to fusing together the individual monitored spectral platform state signals.

In addition to one or more of the features described above or below, or as an alternative, further embodiments include:
a feature, wherein the electronic platform state estimator module comprises an electronic platform model prediction unit and an electronic measurement update module. The electronic platform model prediction unit is configured to generate an electronic predicted initial dynamic state signal indicating a predicted initial dynamic state of the platform based on predetermined platform motion model. The electronic measurement update module is configured to fuse together the monitored spectral platform state signals to generate a fused multi-spectral monitored state of the platform. The electronic measurement update module is further configured to apply the fused multi-spectral monitored state of the platform to the predicted initial dynamic state to generate an electronic corrected dynamic state signal indicating the corrected dynamic state of the platform;

a feature, wherein the measurement update model generates an electronic feedback corrected dynamic state signal to the electronic platform model prediction unit;

a feature, wherein the electronic platform model prediction unit dynamically updates the predicted initial dynamic state of the platform based on the corrected dynamic state signal;

a feature, wherein the platform model prediction unit generates the electronic predicted initial dynamic state signal based further on an initial state estimate of the platform;

a feature, wherein the different spectral modalities are selected from the group comprising: a Light Detection And Ranging (LIDAR) modality, a RAdio Detection And Ranging (RADAR) modality, a visible spectrum imaging (VSI) modality and an infra-red (IR) imaging modality; and a feature, wherein the electronic platform model prediction unit and the electronic measurement update unit operate together to execute a Bayesian filter algorithm.

According to another non-limiting embodiment, a method for state estimation of a surface of a platform at sea comprises generating an electronic predicted initial dynamic state signal indicating a predicted initial dynamic state of the platform. The method further includes generating a plurality of independent spectral signals from respective spectral sensors configured to perform measurements at a respective spectral modality. Each spectral signal indicates a respective monitored state of the platform according to the spectral modality of a respective spectral sensor. The method further includes fusing together, using an electronic state estimator unit, the independent spectral signals to generate a fused multi-spectral monitored state of the platform and applying the fused multi-spectral monitored state of the platform to the predicted initial dynamic state. The method further includes outputting an electronic corrected dynamic state signal indicative of a corrected dynamic state of the platform.

In addition to one or more of the features described above or below, or as an alternative, further embodiments include:
dynamically updating the predicted initial dynamic state of the platform using the corrected dynamic state of the platform;

a feature, wherein generating a predicted initial dynamic state of the platform is based on a predetermined motion model that models the motion of the platform according to a respective sea-based state;

a feature, wherein the generating a predicted initial dynamic state of the platform is based further on an initial state estimate of the platform;

processing each spectral signal with a respective predetermined appearance-based model that models a geometric representation of the platform;

a feature, wherein the different spectral modalities are selected from the group comprising a Light Detection And Ranging (LIDAR) modality, a RAdio Detection And Ranging (RADAR) modality, a visible spectrum imaging (VSI) modality and an infra-red (IR) imaging modality;

determining the corrected dynamic state signal using a Bayesian filter algorithm; and applying the Bayesian filter algorithm to the fused spectral signals and the electronic predicted initial dynamic state signal.

In contrast to conventional efforts in autonomous landing and shipboard state estimation, various non-limiting embodiments of the invention provide one or more technical effects, including but not limited to, employing a probabilistic framework in which individual sensor processes covering a wide-range of spectral modalities (e.g., radio, visible light, infrared light, etc.) are fused into a single state estimate using a filtering framework (e.g., Bayesian filtering) to enable accurate and robust determination of a landing location. Accordingly, unlike conventional autonomous landing and shipboard state estimations, at least one embodiment of the invention estimates the state of a platform at sea without requiring communication with a landing system and sensors installed on the platform itself. In this manner, an autonomous UAV operating according to at least one embodiment of the invention can land on various sea-based platforms that exclude platform-installed landing systems.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Various embodiments provide a system that tracks surface of a platform including a desired landing position in real-time that allows an autonomous unmanned aerial vehicle (hereinafter referred to as an "autonomous UAV") to land at the desired landing position without requiring communication between the autonomous UAV and tracking systems installed on the platform, e.g., a ship deck of a ship. Contrary to conventional autonomous sea-based landing systems, at least one embodiment of the invention employs a probabilistic framework in which outputs of various sensors installed on the autonomous UAV are fused into a common filter estimate such as, for example, a Bayesian filter, to model the platform in real-time and determine the desired landing position. In this manner, at least one non-limiting embodiment of the invention allows an autonomous UAV to land on a platform, e.g., a ship deck, which lacks an installed landing tracking system.

Figure 1:
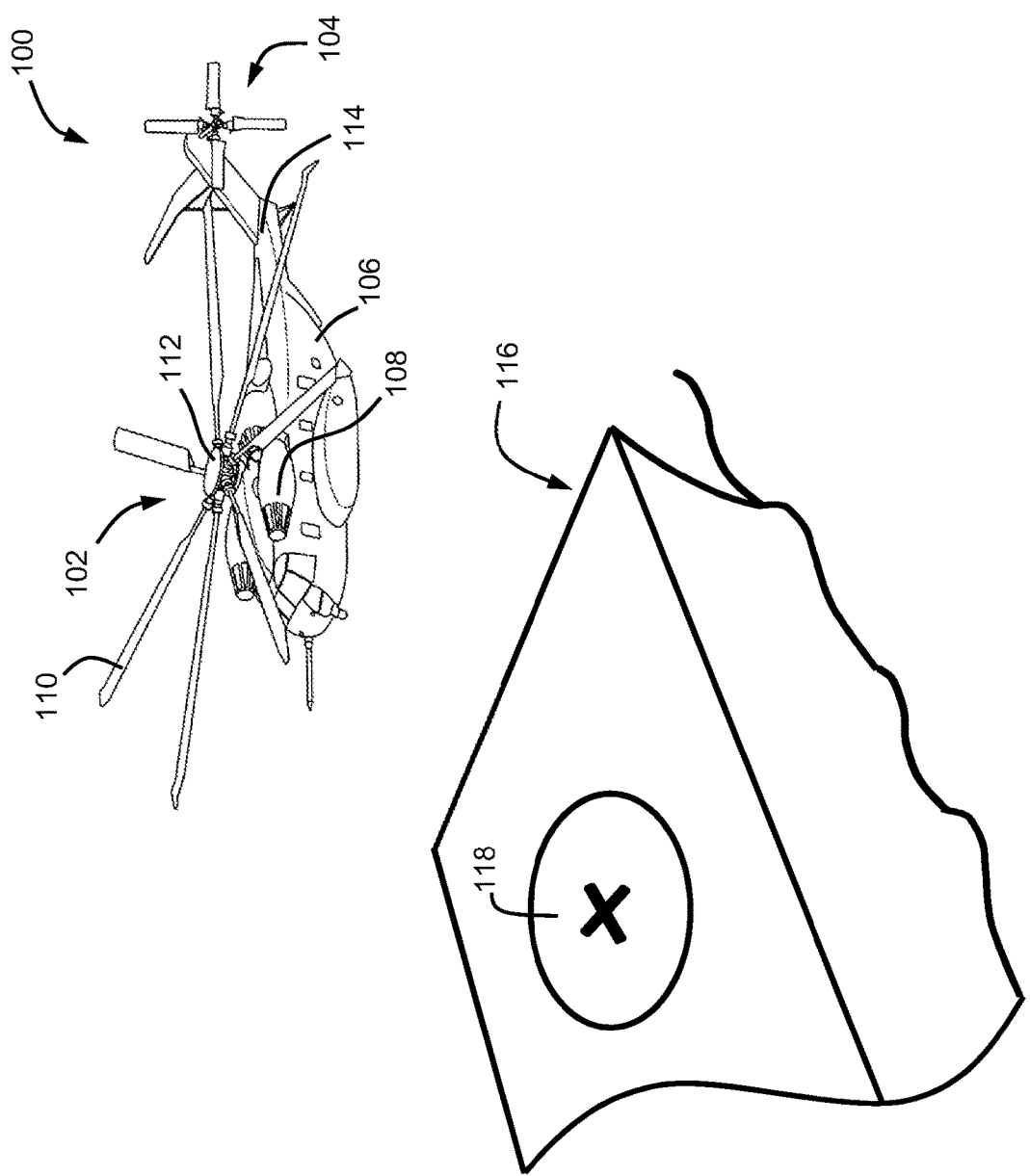
FIG. 1 illustrates an exemplary autonomous unmanned aerial vehicle (UAV) in a landing scenario according to a non-limiting embodiment of the invention.

Referring now to the drawings, FIG. 1 illustrates an autonomous UAV 100 (hereinafter "autonomous UAV 100") which is moving into a desired landing position 118 located on a platform such as, for example, a ship deck of a ship 116 in accordance with an embodiment of the invention. In other embodiments, autonomous UAV 100 can be approaching a ship deck (or platform) or other surface of a sea-based structure at sea. It should be appreciated that although the autonomous UAV 100 is illustrated as a rotary aircraft 100 in FIG. 1, the autonomous UAV 100 is not limited thereto. For example, the autonomous UAV 100 may include a non-rotary autonomous UAV.

According to a non-limiting embodiment, the autonomous UAV 100 includes a main rotor assembly 102, which is driven about an axis of rotation, via a main gearbox, by one or more engines 108. Main rotor assembly 102 includes multiple rotor blades 110 mounted to a rotor hub 112. Aircraft 100 also includes an airframe 106 having an extending tail 114, which mounts a tail rotor system 104, such as an anti-torque system, a translational thrust system, a pusher propeller, a rotor propulsion system, or the like. Although a particular autonomous UAV 100 configuration is illustrated and described in the disclosed embodiment for ship deck landings, other configurations and/or machines in various sea-based applications, such as high speed compound rotary wing aircraft with supplemental translational thrust systems, dual contra-rotating, coaxial rotor system aircraft, turboprops, tilt-rotors, and tilt-wing aircraft for surveillance, transfer of supplies, ship to shore and deep-sea oil rig maintenance operations will also benefit from embodiments of the invention.

Figure 2:
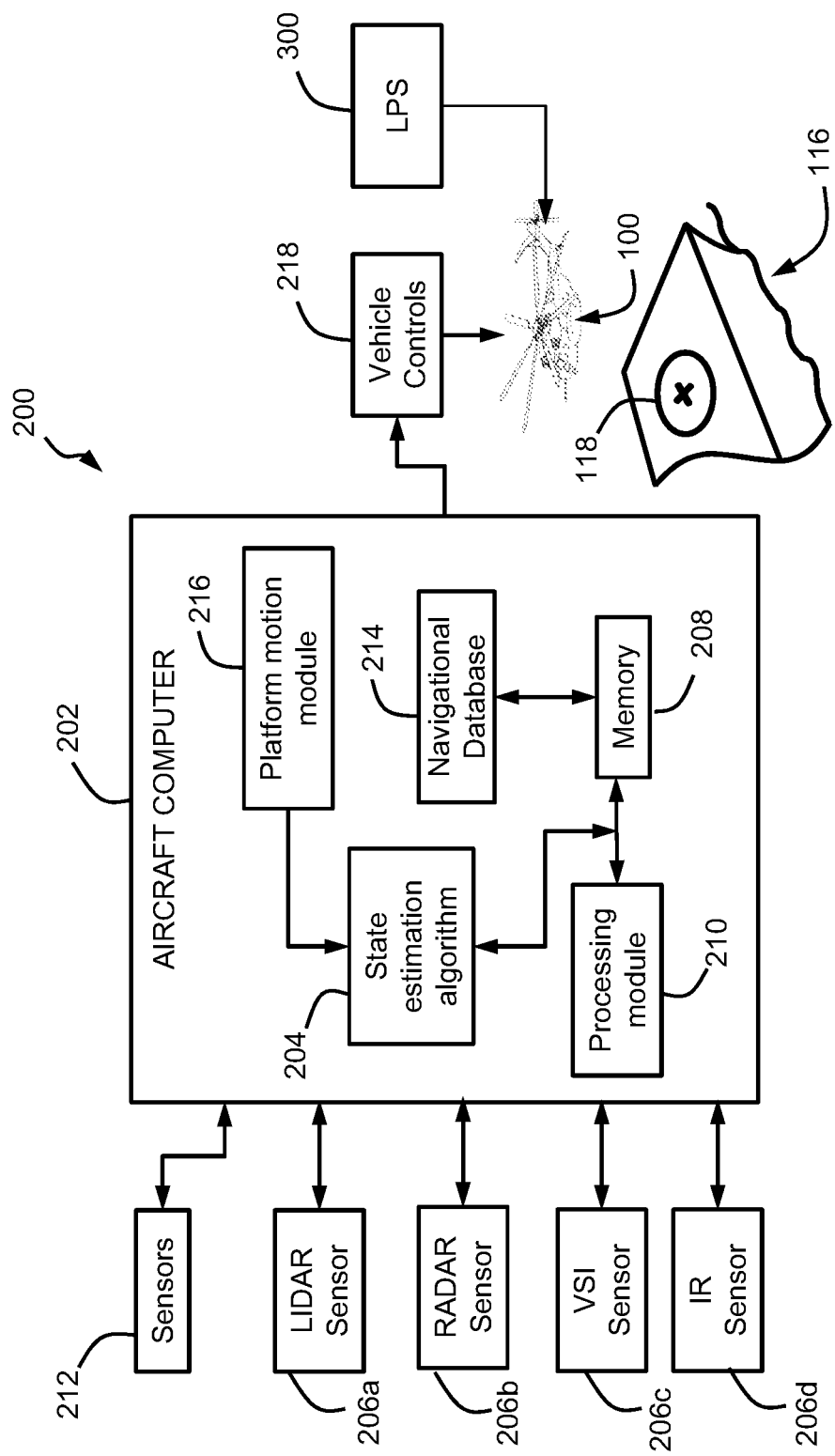
FIG. 2 is a schematic diagram of an exemplary electronic control system implemented in an autonomous UAV according to a non-limiting embodiment of the invention.

FIG. 2 illustrates a schematic block diagram of an electronic control system 200 on board the autonomous UAV 100 in accordance with a non-limiting embodiment. As illustrated, the electronic control system 200 includes an aircraft computer 202 that executes instructions for implementing a state estimation algorithm 202 for online tracking and state estimation of a desired landing location 118 in order to enable safe landing of autonomous UAV 100 at various sea-states. Aircraft computer 202 can receive spectral sensor parameters and data from one or more spectral sensors 206a-206d. Each of the spectral sensors 206a-206d performs measurements in a particular spectrum (e.g., radio spectrum, visible light spectrum, infrared spectrum, etc.). The spectral sensors include, but are not limited to, a Light Detection And Ranging (LIDAR) sensor 206a, a RAdio Detection And Ranging (RADAR) sensor 206b, a visible spectrum imaging (VSI) sensor 206c and one or more infra-red (IR) imaging sensors such as, for example, a short-wave infra-red (SWIR) imaging sensor 106d. These parameters are stored in an aircraft computer 202. Other sensors 212 can include navigation systems such as global positioning systems ("GPS"), other global/inertial frame localization infrastructure, for example, an inertial measurement unit ("IMU") that can provide estimates to incremental changes in pose (e.g., position and orientation) of autonomous UAV 100, or sensors that can provide sensed parameters related to the aircraft's angular rate, attitude, acceleration rate, magnitude and direction of wind speed relative to the autonomous UAV 100, or the like.

Computer 202 includes a memory 208 that communicates with a processing module 210. Memory 208 stores one or more models and/or algorithms such as, for example, state estimation algorithm 204 as executable instructions that is executed by processing module 210. The instructions may be stored or organized in any manner and at any level of abstraction, such as in connection with the execution of state estimation algorithm 204. Also, in embodiments, memory 208 may include random access memory (RAM), read only memory (ROM), or other electronic, optical, magnetic or any other computer readable medium onto which is stored the state estimation algorithm 204 described below.

Processing module 210 can be a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. In an embodiment, processing module 210 can include a LIDAR processor in order to process the associated 3D point cloud data using one or more processing algorithms to produce one or more processed signals.

The electronic control system 200 may include a database 214. Database 214 may be used to store inertial navigational data that may be acquired by IMU or GPS including pose estimates and operating conditions of the autonomous UAV 100 such as, for example, lateral acceleration, attitude, and angular rate, magnitude, and direction of wind speed relative to autonomous UAV 100. Also, sensor data acquired by 3D-LIDAR, and/or any point cloud data that may be used by state estimation algorithm 204 may be stored in database 214. The data stored in database 214 may be based on one or more other algorithms or processes for implementing state estimation algorithm 204. For example, in some embodiments data stored in database 214 may be a result of the processing module 210 having subjected data received from LIDAR sensor 206 to one or more filtering processes. Database 214 may be used for any number of reasons. For example, database 214 may be used to temporarily or permanently store data, to provide a record or log of the data stored therein for subsequent examination or analysis, etc.

A platform motion module 216 stores one or more sea-based object motion models and provides these to processing module 210. The sea-based object motion models include, for example, one or more ship motion models capable of predicting the response of the ship 116 (see FIG. 1), for example, advancing at potentially varying forward speed with arbitrary heading in both regular and irregular seas. The electronic control system 200 may provide one or more controls, such as vehicle controls 218. Vehicle controls 218 may provide flight control command signals required for flight augmentation of autonomous UAV 100 in order to land on a surface of a platform including the desired landing location 118 (see FIG. 1).

According to a non-limiting embodiment of the invention, the autonomous UAV 100 further includes an electronic landing platform state (LPS) module 300 that executes a landing platform state estimation algorithm. The landing platform state estimation algorithm employs a probabilistic framework in which individual sensor outputs from the spectral sensors 206a-206d are fused (i.e., blended) into a common estimate of a platform state. The estimated platform state can be defined using various parameters including, but not limited to, three-dimensional (3-D) position parameters, attitude parameters, and rate parameters. For instance, a linear platform surface at sea can be modeled and tracked in real-time to allow the autonomous UAV 100 to land at the desired landing position 118 under various sea states.

A collection of independent and asynchronous platform state sensor processes are deployed across various electronic computing units installed aboard the autonomous UAV 100. According to an embodiment, each spectral sensor process is responsible for generating its own respective estimate, e.g., each individual sensor generates an independent respective six degrees of freedom (6DoF), of the platform state and/or a subset of state variables using its respective signal processing and/or respective perception algorithms. Each output process is converted into a neutral data form such that the combination of the output processes can be fused together. Whenever a process has generated a platform state estimate, then this measurement is reported and fused into a measure update of the filter. Accordingly, the autonomous UAV 100 can model the platform state and determine a desired landing position without communicating with an external landing/tracking system installed on the platform.

According to further non-limiting embodiments, each spectral sensor process has access to any additional information (e.g., intrinsic/extrinsic calibration parameters) needed to generate its respective state estimates, as well as various models of its measurement uncertainty (e.g., additive Gaussian filter noise). The platform state reported by each spectral sensor 206a-206d can be relative to the autonomous UAV 100/vehicle body frame, or relative to some global inertial frame based on the implementation. Additional embodiments provide a feature where each spectral sensor process has a corresponding "inverse sensor model" that can be leveraged in a parametric, e.g., an extended Kalman Filter (EKF) model that assumes Gaussian process and measurement noise, or a non-parametric setting, e.g., a particle-filter which makes no assumption regarding the properties of the prior/posterior, or a hybrid methodology. In this manner, the fused common estimate of the platform estimate can be calculated using a Bayesian predictor/correction algorithm.

Figure 3:
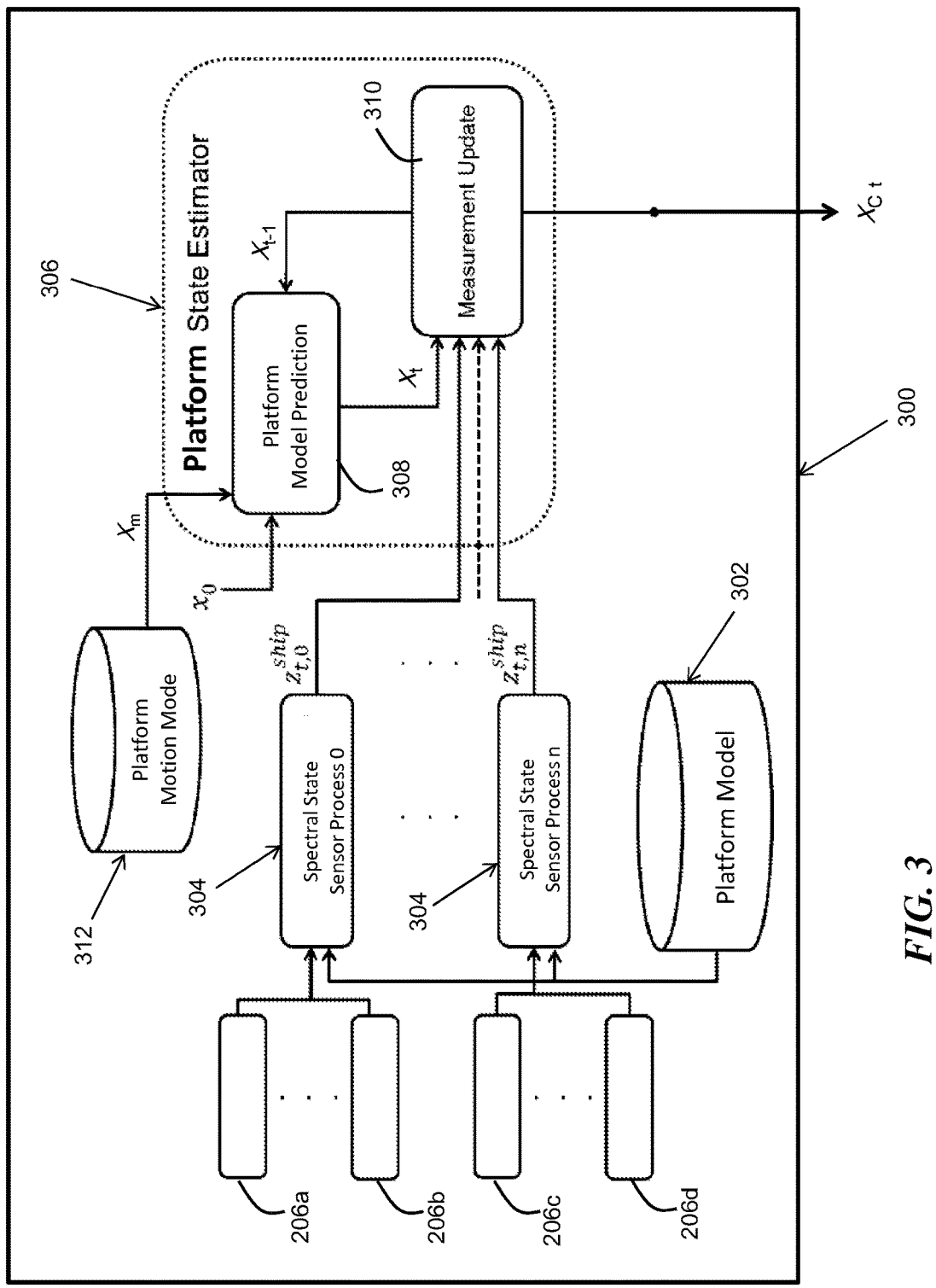
FIG. 3 illustrates a dataflow diagram of a landing platform state estimation algorithm according to a non-limiting embodiment of the invention.

Turning now to FIG. 3, a dataflow diagram of a landing platform state estimation algorithm executed by an electronic LPS module 300 installed on the autonomous UAV 100 is illustrated according to a non-limiting embodiment of the invention. It should be appreciated that the LPS module 300 includes memory capable of storing various models and/or parameters. The landing platform state estimation algorithm receives inputs from a plurality of different spectral sensors 206a-206d. As described, each spectral sensor 206a-206d generates its own respective output (e.g., 6DoF data) indicating the state of a platform such as, for example, a landing deck of a ship 116. Although a single spectral sensor 206a-206d is illustrated for each spectral modality, it is appreciated that multiple spectral sensors (e.g., two LIDAR sensors 206a, four RADAR sensor 206b, three VSI sensors 206c, etc.) can be used.

The LPS module 300 may also store one or more platform models 302 that predict the appearance and structural shape of one or more platforms. The platform models may include appearance-based model (e.g., intensity value), geometry model (e.g., 2D/3D CAD (Computer-Aided Design) models), etc. For example, the appearance-based platform models 302 may provide geometric representations of a platform various ship decks of different ships capable of providing a landing location for the autonomous UAV 100. According to an embodiment, the platform models 302 include individual platform models corresponding to a respective modality of each spectral sensor 206a-206d. The output of each spectral sensor 206a-206d along with one or more appearance-based platform models 302 is utilized by a respective platform state sensor process modules 304. The platform state sensor process modules 304 output an individual platform state ($Z_{t0}$-$Z_{tm}$) corresponding to a spectral modality of a respective spectral sensor 206a-206d. That is, each platform state sensor process module 304 receives an output from a respective spectral sensor 206a-206d, and executes a particular spectral process on the output corresponding to the particular modality of the respective spectral sensor 206a-206d. The individual processed platform states ($Z_{t0}$-$Z_{tm}$) are input to a platform state estimator module 306, which is described in greater detail below.

The platform state estimator module 306 includes an electronic platform model prediction unit 308, and an electronic measurement update unit 310. The LPS module 300 may also store one or more platform motion models 312. The platform motion models 312 are dynamic models that predict the sea-based motion of the platform that includes the desired landing position 118. According to an embodiment, an initial state estimation ($X_0$) of the platform state and/or a dynamic model ($X_m$) is input to the electronic platform model prediction unit 308. The electronic platform model prediction unit 308 in turn outputs a predicted initial dynamic state of the platform ($X_t$).

The electronic measurement update unit 310 receives the predicted initial dynamic state of the platform ($X_t$), along with the individual spectral platform states ($Z_{t0}$-$Z_{tm}$) output by the platform state sensor processes 304. The spectral platform states ($Z_{t0}$-$Z_{tm}$) are fused together by the measurement update unit 310 to generate a fused monitored state of the platform, which is then used to correct the initial dynamic state of the platform (Xt). The measurement update unit 310 outputs both a corrected dynamic state signal ($Xc_t$) and a corrected dynamic feedback signal ($X_{t-1}$). The corrected dynamic feedback signal ($X_{t-1}$) is continuously feedback to the electronic platform model prediction unit 308 and is used to dynamically update the predicted initial dynamic state of the platform (Xt). Accordingly, the combination of the electronic platform model prediction unit 308 and the measurement update unit 310 operates as a Bayesian filter to continuously update the predicted initial dynamic state of the platform (Xt). The corrected dynamic state signal ($Xc_t$) is ultimately utilized by the autonomous UAV 100 to continuously obtain a more precise estimation of the platform state as the environment surrounding the platform dynamically changes. In this manner, the autonomous UAV 100 can land at the desired landing position 118 with greater precision.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method for state estimation of a surface of a platform at sea, comprising:
generating, using an electronic control system on board an aircraft, an electronic predicted initial dynamic state signal indicating a predicted initial dynamic state of the platform, the predicted initial dynamic state of the platform being based on a platform motion model that predicts motion of the platform;
generating, using an electronic landing platform state module of the aircraft, a plurality of independent spectral signals using an output from a plurality of respective spectral sensors and a plurality of platform models for predicting an appearance and structural shape of the platform, the plurality of spectral sensors being located on board the aircraft and configured to perform measurements for a respective spectral modality, and each of the plurality of platform models corresponds to a respective spectral modality of the plurality of spectral sensors, each spectral signal indicating a respective monitored state of the platform according to the spectral modality of a respective spectral sensor;
converting each independent spectral signal into a common neutral data form;
fusing together, using an electronic state estimator unit, the converted independent spectral signals to generate a fused multi-spectral monitored state of the platform;
applying the fused multi-spectral monitored state of the platform to the predicted initial dynamic state; and
outputting an electronic corrected dynamic state signal indicative of a corrected dynamic state of the platform so that the aircraft may use the corrected dynamic state of the platform to land on the surface of the platform.

2. The method of claim 1, further comprising dynamically updating the predicted initial dynamic state of the platform using the corrected dynamic state of the platform.

3. The method of claim 1, wherein the generating a predicted initial dynamic state of the platform is based further on an initial state estimate of the platform.

4. The method of claim 3, wherein the generating a plurality of independent spectral signals from each spectral sensor further includes processing each spectral signal with a respective predetermined appearance-based model that models a geometric representation of the platform.

5. The method of claim 4, wherein the different spectral modalities are selected from the group comprising a Light Detection And Ranging (LIDAR) modality, a RAdio Detection And Ranging (RADAR) modality, a visible spectrum imaging (VSI) modality and an infra-red (IR) imaging modality.

6. The method of claim 1, further comprising determining the corrected dynamic state signal using a Bayesian filter algorithm.

7. The method of claim 6, wherein the using a Bayesian filter algorithm further comprises applying the Bayesian filter algorithm to the fused spectral signals and the electronic predicted initial dynamic state signal.

8. An electronic landing platform state module configured to generate a state estimation of a platform surface at sea, the landing platform state module comprising:
a plurality of electronic platform state process modules configured to receive an output from a respective spectral sensor and a platform model for predicting an appearance and structural shape of the platform corresponding to a respective spectral modality of the respective spectral sensor, wherein each of the plurality of electronic platform state process modules output a monitored spectral platform state signal in response to applying a spectral process on a respective output, each spectral process corresponding to a particular spectral modality of the respective spectral sensor; and
an electronic platform state estimator module in electrical communication with the plurality of electronic platform state process modules, the electronic platform state estimator module including an electronic platform model prediction unit operable to predict and initial dynamic state of the platform based on a motion model that predicts motion of the platform, the electronic platform state estimator module being configured to determine a corrected dynamic state of the platform in response to fusing together the monitored spectral platform state signals and applying the fused spectral platform state signal to the initial dynamic state of the platform, the corrected dynamic state of the platform being output to an aircraft so that the aircraft may use the corrected dynamic state of the platform to land on the platform surface of the platform;

wherein the landing platform state module and the plurality of spectral sensors are located onboard the aircraft.

9. The electronic landing platform state module of claim 8, wherein the electronic platform state estimator module comprises:

an electronic measurement update module in electrical communication with the electronic platform model prediction unit, the electronic measurement update module configured to fuse together the monitored spectral platform state signals to generate a fused multi-spectral monitored state of the platform, and to apply the fused multi-spectral monitored state of the platform to the predicted initial dynamic state to generate an electronic corrected dynamic state signal indicating the corrected dynamic state of the platform.

10. The electronic landing platform state module of claim 9, wherein the measurement update model generates an electronic feedback corrected dynamic state signal to the electronic platform model prediction unit.

11. The electronic landing platform state module of claim 10, wherein the electronic platform model prediction unit dynamically updates the predicted initial dynamic state of the platform based on the corrected dynamic state signal.

12. The electronic landing platform state module of claim 11, wherein the platform model prediction unit generates the electronic predicted initial dynamic state signal based further on an initial state estimate of the platform.

13. The electronic landing platform state module of claim 12, wherein the different spectral modalities are selected from the group comprising: a Light Detection And Ranging (LIDAR) modality, a RAdio Detection And Ranging (RADAR) modality, a visible spectrum imaging (VSI) modality and an infra-red (IR) imaging modality.

14. The electronic landing platform state module of claim 8, wherein the electronic platform model prediction unit and the electronic measurement update unit operate together to execute a Bayesian filter algorithm.

* * * * *